J. M. STONE.
Turning Lathe.
No. 12,708. Patented April 10, 1855.
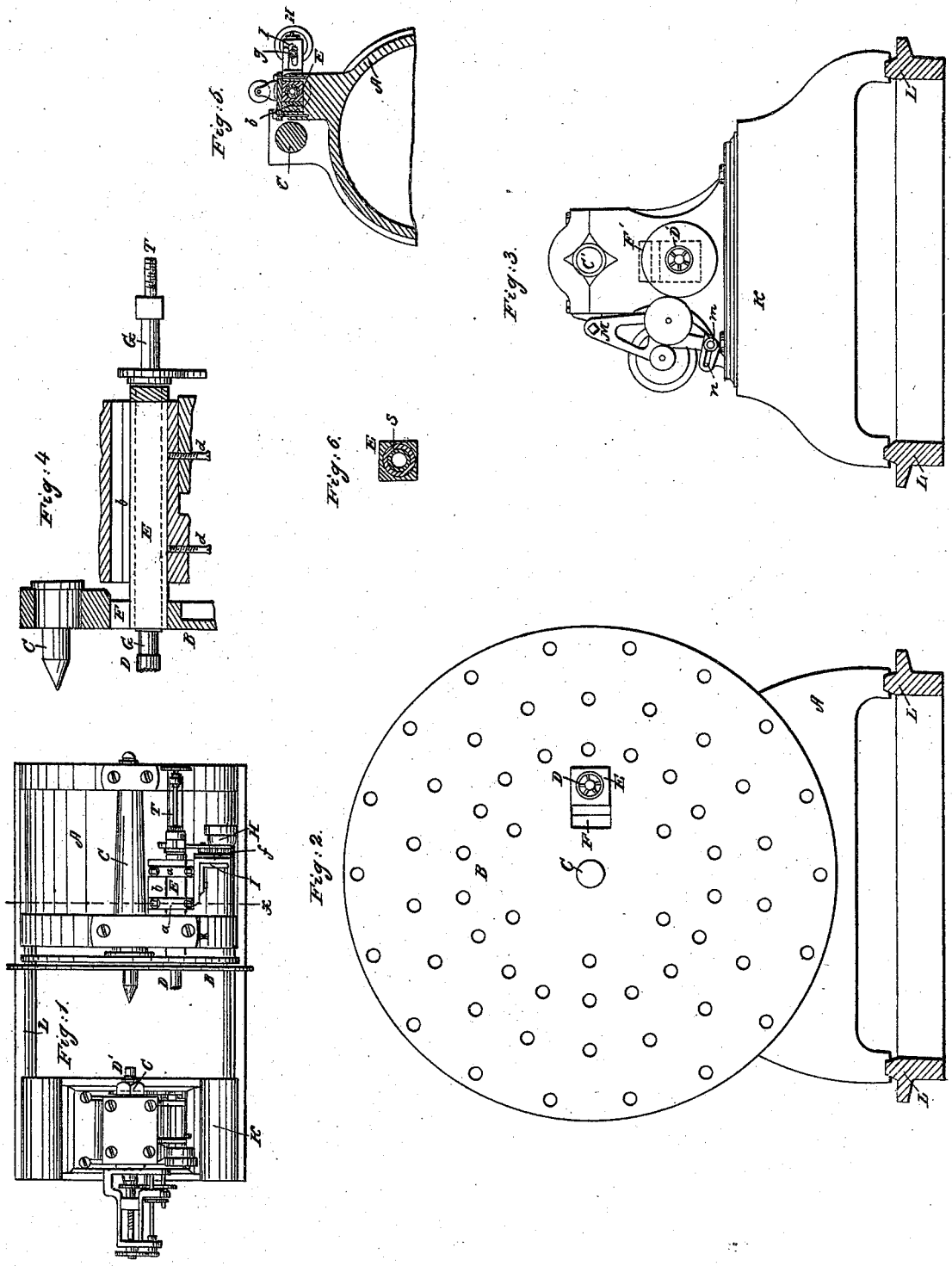

UNITED STATES PATENT OFFICE.

J. M. STONE, OF MANCHESTER, NEW HAMPSHIRE, ASSIGNOR TO MANCHESTER LOCOMOTIVE WORKS.

LATHE FOR TURNING LOCOMOTIVE-DRIVERS.

Specification of Letters Patent No. 12,708, dated April 10, 1855.

*To all whom it may concern:*

Be it known that I, J. M. STONE, of Manchester, in the county of Hillsborough and State of New Hampshire, have invented a new and useful Improvement in Lathes for Turning Locomotive-Drivers, of which the following is a full, clear, and exact description, reference being had to the annexed drawings, making part of this specification, in which—

Figure 1 is a plan of a lathe with my improvements attached; Fig. 2, a front view of the face plate of the same; Fig. 3, a view of the foot stock; Figs. 4. 5, and 6, detached views which will be referred to hereafter.

In finishing locomotive drivers it is customary after the tire is turned off to take them from the lathe to another machine, where, after the points are carefully laid out, the holes for the wrist pins are bored. At other times this is performed by a detached drill which is temporarily secured to the lathe for the purpose; but in this case as before the points must first be laid out, and this part of the operation requires to be performed with extreme care and nicety, and consumes considerable time, as it is necessary that the two be at exactly the same distance from the axis of the wheels, and upon radii forming an angle of 90° with each other.

To dispense with this portion of the operation is the object of my present invention, which consists in mortising the face plate of the lathe upon which the wheels are turned off, and passing one of the drills through the opening so made. Another drill for the purpose of boring the opposite wheel being mortised through the foot stock, in a manner which will be presently explained. The axes of these drills are placed parallel to the axis of the lathe, the one vertically beneath it and the other in a horizontal plane passing through it, and the drills are made capable of adjustment so as to bring them to exactly the same distance from the center of the wheels, and also to accommodate them to different lengths of stroke, and thus the two wheels may be bored with extreme exactness, without the necessity of laying out the points by hand as before mentioned, and without removing the wheels from the centers upon which they have been turned.

To enable others skilled in the art to understand my invention and construct my machine I will proceed to explain its construction and operation referring generally to those parts of the machine which do not differ materially from other machines of the kind, and describing more particularly those parts which are the subject of my invention.

In the accompanying drawings A is the head stock; B the face plate; C the mandrel upon which the wheels are centered; D the drill or cutters which project through the mortise F in the face plate and is made capable of a sufficient horizontal motion to accommodate it to the different lengths of stroke in the following manner.

G is the shaft to which this drill is attached; this shaft is cased in the rectangular box E, which is allowed a horizontal side motion within certain limits, for the purpose of regulating the distance of the drill from the mandrel.

In Fig. 6 is seen upon an enlarged scale the shaft G with its rectangular casing E. The shaft is immediately surrounded by the tube or pipe S with which it revolves, and in which it slides with a spline and groove. The tube is driven by the cog wheel *r* and the shaft G revolves with it; the latter is fed through the tube by the screw T.

The boxing E is confined in its position by the bars *a* and its distance from the mandrel is regulated by the introduction of one or more plates or boards *b* of a known and exact thickness, by means of which the drill may be placed at the requisite distance from the center of the lathe for any required length of stroke. When thus adjusted the drill is firmly secured in place by the screws *d*. The drill is actuated and fed in a manner not differing essentially from that usually employed and need not be particularly described. That the driving pulleys H and the gearing immediately connected therewith may follow the drill as it is moved to and from the mandrel these pulleys are attached to a piece *f*, which slides in the carrying bracket I, and is confined in place by the set screw *g*.

K is the foot stock which slides upon the ways L, and carries the spindle C′ which is broken away in Fig. 1 to show the drill D′ beneath it; this drill which is mortised through the foot stock as seen in Fig. 3 is arranged in a manner precisely similar to the other drill D and is allowed to move vertically in the mortise F' plates or boards similar to b, being used to determine the distance of this drill from the axis of the lathe; the drill is fed and operated as in the former case, the driving pulleys and gearing being hung in a suspended frame M, Fig. 3, in order to adjust them to the varying positions of the drill; this frame is secured in position by the means of the screw m, and slot n.

Operation: The tires of the drivers having been turned off the drills D, D' are run up, the one through the face plate, the other through the foot stock and having been adjusted to equal distances from the axis of the lathe they are then set in motion and the holes are both bored at once. The drills are in each case operated by a counter shaft separate and distinct from that which drives the lathe.

The casing which surrounds the shaft of the drill D requires to be withdrawn from the mortise in the face plate when the latter is to be used—the other drill D' is simply retracted by its feeding screw T', a sufficient distance to clear the wheel.

What I claim as my invention and desire to secure by Letters Patent is—

The drills D, D', in combination with the turning lathe, the one being mortised through the face plate, the other through the foot stock in the manner and for the purpose substantially as herein set forth.

J. M. STONE.

Witnesses:
SAM COOPER,
JOHN S. CLOW.